United States Patent
Liang

(10) Patent No.: US 8,213,191 B2
(45) Date of Patent: Jul. 3, 2012

(54) CONSTANT-CURRENT CIRCUIT CAPABLE OF VOLTAGE COMPENSATION AND ZERO-VOLTAGE SWITCHING

(75) Inventor: Jim-Hung Liang, Taipei (TW)

(73) Assignee: Skynet Electronic Co., Ltd., Taipei (TW)

( * ) Notice: Subject to any disclaimer, the term of this patent is extended or adjusted under 35 U.S.C. 154(b) by 183 days.

(21) Appl. No.: 12/659,860

(22) Filed: Mar. 24, 2010

(65) Prior Publication Data
US 2011/0235371 A1      Sep. 29, 2011

(30) Foreign Application Priority Data
Jan. 26, 2010   (TW) ................................ 99102061 A

(51) Int. Cl.
*H02M 3/335*   (2006.01)
(52) U.S. Cl. ............................................ 363/21.12
(58) Field of Classification Search .............. 363/15, 363/16, 20, 21.01, 21.04, 21.12
See application file for complete search history.

(56) References Cited

U.S. PATENT DOCUMENTS

| | | | |
|---|---|---|---|
| 6,172,885 B1 * | 1/2001 | Feldtkeller | 363/21.1 |
| 6,259,615 B1 * | 7/2001 | Lin | 363/98 |
| 6,445,598 B1 * | 9/2002 | Yamada | 363/21.12 |
| 7,764,089 B2 * | 7/2010 | Iwabuchi et al. | 327/108 |
| 7,869,229 B2 * | 1/2011 | Huynh et al. | 363/21.01 |
| 8,018,741 B2 * | 9/2011 | Huynh et al. | 363/21.01 |

* cited by examiner

*Primary Examiner* — Adolf Berhane
(74) *Attorney, Agent, or Firm* — Bacon & Thomas, PLLC

(57) ABSTRACT

The present invention is to provide a constant-current circuit capable of voltage compensation and zero-voltage switching, wherein the constant-current circuit is a single-switch isolated flyback converter and includes a control circuit, a sensing resistor, a transformer, a voltage divider, and a primary-side power switch. The control circuit obtains information related to a primary-side current of the transformer by way of the sensing resistor and obtains a compensation signal from an input voltage by way of the voltage divider, so as to control the primary-side power switch accordingly. Due to a compensating effect of the compensation signal, a peak voltage resulting from the sensing resistor is adjusted to a reference voltage through adding the compensation signal thereto, thereby enabling the constant-current circuit to generate a constant output current over a wide range of input voltage.

21 Claims, 15 Drawing Sheets

CONSTANT-CURRENT CIRCUIT CAPABLE OF VOLTAGE COMPENSATION AND ZERO-VOLTAGE SWITCHING

FIELD OF THE INVENTION

The present invention relates to a constant-current circuit, more particularly to a constant-current circuit capable of voltage compensation and zero-voltage switching, which utilizes a sensing resistor to obtain information related to a primary-side current of a transformer and utilizes a voltage divider to obtain a compensation signal from an input voltage, so as to control a primary-side power switch for adjusting a peak voltage resulting from the sensing resistor to a reference voltage through adding the compensation signal thereto, thereby enabling the constant-current circuit to generate a constant output current.

BACKGROUND OF THE INVENTION

Recently, as energy saving and carbon dioxide reduction have become a global campaign, and with the awareness of environmental protection on the rise, there is a trend to replace lighting apparatuses using the traditional incandescent or fluorescent lamps with those using light-emitting diodes (LEDs), which consume less power and have a longer service life. In order to ensure that LEDs maintain their design luminosity and thereby enable an LED-based lighting apparatus to provide high-efficiency and high-precision lighting, it is common practice to equip an LED-based lighting apparatus with an LED driving circuit. The LED driving circuit provides a stable output current to the LEDs and thus allows the LEDs to emit light at a fixed luminosity. By contrast, the unstable input voltage of a common driving circuit tends to cause unstable luminosity of LEDs or even generate an excessively high output current that may burn the LEDs.

Conventionally, referring to FIG. 1, the easiest way to design an LED driving circuit is to make a simple constant-current circuit out of a Zener diode DZ1, a PNP transistor Q1, and two resistors R1, R2, among other components. This constant-current circuit generates a fixed output current $I_O$ according to Equation (1):

$$I_O = \frac{V_{Zener} - V_{EB(PNP)}}{R1} \quad (1)$$

where $V_{Zener}$ represents the breakdown voltage of the Zener diode DZ1, and $V_{EB(PNP)}$ represents the emitter-base voltage of the PNP transistor Q1. Thus, an input voltage Input of the constant-current circuit is converted into the fixed output current $I_O$. For example, if the breakdown voltage $V_{Zener}$ of the Zener diode DZ1 is 5.1V, R1 is 10Ω, and the emitter-base voltage $V_{EB(PNP)}$ of the PNP transistor Q1 is 0.7 V, then the output current $I_O$ of the constant-current circuit is determined by Equation (1) as 440 mA:

$$I_O = \frac{V_{Zener} - V_{EB(PNP)}}{R1} = \frac{5.1\ V - 0.7\ V}{10\ \Omega} = 0.44\ A = 440\ mA$$

Although a constant-current circuit of this kind is advantageously simple in structure and incurs relatively low costs, it is disadvantaged by the fact that both the breakdown voltage $V_{Zener}$ of the Zener diode DZ1 and the emitter-base voltage $V_{EB(PNP)}$ of the PNP transistor Q1 vary with temperature, and consequently the output current $I_O$ of the constant-current circuit is highly temperature-dependent. Moreover, considerable power loss occurs when there is a large difference between the input voltage and the output voltage of the constant-current circuit, and as a result, the circuit's power utilization efficiency is lowered.

With a view to overcoming the temperature-dependency and low power utilization efficiency of the aforesaid simple constant-current circuit, a constant-current circuit based on the principle of a single-switch isolated flyback converter was developed, as shown in FIG. 2. In the constant-current circuit of FIG. 2, a current sensing element $R_S$ is series-connected in the path of the output current $I_O$ so that information related to the output current $I_O$ can be obtained via the resistance of the current sensing element $R_S$. After the information related to the output current $I_O$ is amplified A-fold by a voltage amplifier circuit V-Amp, the amplification result $A \times R_S \times I_O$ is input to an error amplifier circuit EA, which compares the amplification result with a reference voltage $V_{ref}$ and generates a control signal accordingly. The control signal is sent to a control circuit CC by way of an optical coupler OC. The control circuit CC switches a power switch Q2 according to the control signal and the following Equation (2), so as to adjust the voltage at the primary winding $N_P$ of a transformer T and thereby allow the secondary winding $N_S$ to maintain a constant output current $I_O$:

$$A \times I_O \times R_S = V_{ref} \rightarrow I_O = \frac{V_{ref}}{A \times R_S} \quad (2)$$

For example, if the resistance of the current sensing element $R_S$ is 0.1Ω, the voltage amplifier circuit V-Amp has an amplification factor of 100, and the reference voltage $V_{ref}$ is 2.5 V, then the output current $I_O$ of the constant-current circuit is determined by Equation (2) as 250 mA:

$$I_O = \frac{2.5\ V}{0.1\Omega \times 100} = 0.25\ A = 250\ mA$$

However, in spite of overcoming the drawbacks of the aforesaid simple constant-current circuit, the single-switch isolated flyback converter-based constant-current circuit has its own shortcomings, such as a complicated circuit structure and high costs. Furthermore, as the control circuit CC relies on an optical coupling isolation element (i.e., the optical coupler OC) to transmit signals, the overall production costs and circuit layout complexity of the single-switch isolated flyback converter-based constant-current circuit are bound to be much higher than those of the aforesaid simple constant-current circuit.

To eliminate the use of optical coupling isolation elements, another constant-current circuit based on the single-switch isolated flyback converter was developed, as shown in FIG. 3. While the constant-current circuit in FIG. 3 is very similar in structure to that shown in FIG. 2, the former is different from the latter in that the control circuit CC in FIG. 3 must exercise control in accordance with the following three conditions, but there is no such limitation for the constant-current circuit of FIG. 2:

(a) the switching frequency of the power switch Q3 must be kept constant;
(b) the transformer T must be operated in discontinuous conduction mode (DCM); and
(c) the control circuit CC must perform current-mode control.

If the peak value $i_{p\text{-}peak}$ of a current $i_p$ in the primary winding $N_P$ of the transformer T can be fixed while the foregoing three conditions are met, an output current having a fixed power will be generated according to Equation (3):

$$V_{ref} = i_{P\text{-}peak} \times R_4 \rightarrow i_{P\text{-}peak} = \frac{V_{ref}}{R_4} \quad (3)$$

where $R_4$ represents resistance, and $V_{ref}$ represents a direct-current (DC) reference voltage. The control circuit CC obtains information related to the current $i_p$ in the primary winding $N_P$ by way of the resistance $R_4$, such that the information obtained has a voltage waveform of $i_p \times R_S$. If the peak voltage $i_{p\text{-}peak} \times R_S$ resulting from the current $i_p$ in the primary winding $N_P$ is equal to the DC reference voltage $V_{ref}$, then according to Equation (3), the peak value $i_{p\text{-}peak}$ of the current $i_p$ in the primary winding $N_P$ is kept at a fixed value, as shown in FIG. 4. Hence, in order for the constant-current circuit in FIG. 3 to switch from constant-power output to constant-current output and to dispense with the optical coupling isolation element in FIG. 2 (which is configured for obtaining information related to current in the secondary winding), the constant-current circuit in FIG. 3 includes a detection winding $N_V$ for obtaining information related to the output voltage $V_O$, wherein the detection winding $N_V$ is located on the primary side of the transformer T but in phase with the secondary winding $N_S$. The control circuit CC incorporates the information obtained into its computation so as to determine the peak voltage $i_{p\text{-}peak} \times R_S$ resulting from the current $i_p$ in the primary winding $N_P$ and thereby keep the output current $I_O$ constant to a certain degree.

The constant-current circuit of FIG. 3 is advantageous in that it is not necessary for the control circuit CC to obtain information from the secondary side. This is because the acquisition, computation, and conversion of information are all done on the primary side. Consequently, the constant-current circuit shown in FIG. 3 is much simpler in structure than that shown in FIG. 2 and has been the basis of practically all control ICs on the market that are proclaimed to be designed specifically for LEDs. However, the constant-current circuit in FIG. 3 still has its disadvantages. For instance, since the control circuit CC does not obtain information related to the input voltage, the constant-current circuit of FIG. 3 is applicable only where the input voltage varies within a rather narrow range. Besides, as the control circuit CC causes constant-frequency DCM operation, the power switch Q3 must have certain switching loss. Moreover, when the transformer T is operated in constant-frequency DCM, the energy of the flyback power converter is:

$$P_O \times T_S = \frac{1}{2} \times L_m \times i_{P\text{-}peak}^2 \quad (4)$$

where $P_O$ represents output power of the constant-current circuit shown in FIG. 3, $T_S$ represents the switching period of the power switch Q3, and $L_m$ represents the magnetizing inductance of the transformer T. According to Equations (3) and (4), the output power $P_O$ of the constant-current circuit shown in FIG. 3 can be expressed by Equation (5):

$$P_O = \frac{L_m V_{ref}^2}{2 T_S R_4^2} \quad (5)$$

If both the magnetizing inductance $L_m$ of the transformer T and the resistance $R_4$ are fixed, and given that the constant-current circuit shown in FIG. 3 operates in constant-frequency mode, the switching period $T_S$ of the power switch Q3 will also be fixed. Therefore, as long as the DC reference voltage $V_{ref}$ is fixed, the output power $P_O$ of the constant-current circuit shown in FIG. 3 will not vary with the input voltage or output voltage. However, referring to FIG. 5 for the waveform of the drain-source voltage of the power switch Q3, when the constant-current circuit of FIG. 3 is operated in constant-frequency DCM, a voltage as high as $V_{bulk}$ occurs at the instant when the power switch Q3 is turned on. As the power switch Q3 consumes all the voltage $V_{bulk}$, the power switch Q3 tends to generate heat upon conduction. Hence, when the constant-current circuit, of FIG. 3 is operated in constant-frequency DCM, a huge power loss takes place in the power switch Q3 at the instant when it is turned on, thus causing unnecessary waste of electric power.

Commercially available constant-current circuits are typically application circuits derived from the basic structure of the constant-current circuit shown in FIG. 3. For example, the constant-current circuit illustrated in FIG. 6 uses a current control IC which is made by Fairchild Semiconductor and sold under the Model No. FSEZ1016A, the constant-current circuit in FIG. 7 uses a current control IC made by Fairchild Semiconductor and sold under the Model No. FAN103, and the constant-current circuit in FIG. 8 uses a current control IC made by Power Integrations and sold under the Model No. LNK605DG. When these constant-current circuits are operated in constant-frequency DCM, their power switches are all subject to heat generation and undue power loss upon being turned on.

Therefore, it is imperative to overcome the foregoing drawbacks of the prior art and develop a constant-current circuit which has a simple circuit layout with relatively few electronic elements, can do without any secondary constant-current detection circuits or feedback circuits, and yet allows all the necessary information to be obtained from the primary side for computation and execution, so as to generate an output current that remains constant over a wide range of input voltage; and in which the switching loss of power semiconductor elements (including the primary-side power switch and the secondary-side current rectifying element) is effectively reduced to increase power conversion efficiency.

BRIEF SUMMARY OF THE INVENTION

In view of the aforementioned shortcomings of the commercially available constant-current circuits, the inventor of the present invention put years of practical experience into related research and experiments and finally succeeded in developing a constant-current circuit capable of voltage compensation and zero-voltage switching as disclosed herein. According to the present invention, not only can the output current generated by the constant-current circuit remain constant over a wide range of input voltage, but also the switching loss of power semiconductor elements is effectively lowered for the benefit of increasing power conversion efficiency.

It is an object of the present invention to provide a constant-current circuit capable of voltage compensation and zero-voltage switching, wherein the constant-current circuit is a single-switch isolated flyback converter and includes a control circuit, a sensing resistor, a transformer, a voltage divider, and a primary-side power switch. The control circuit obtains information related to a primary-side current of the transformer by way of the sensing resistor and obtains a compensation signal from an input voltage by way of the voltage divider, so as to control the primary-side power switch accordingly. Due to a compensating effect of the compensation signal, a peak voltage resulting from the sensing resistor is adjusted to a reference voltage through adding the compensation signal thereto, thereby enabling the constant-current circuit to generate a constant output current. According to the present invention, an extremely simple circuit layout with inexpensive electronic elements allows all the necessary information to be obtained from the primary side in the absence of any secondary constant-current detection circuits or feedback circuits. The primary-side power switch is controlled according to the information obtained, such that the output current generated by the constant-current circuit remains constant over a wide range of input voltage.

It is another object of the present invention to provide the foregoing constant-current circuit capable of voltage compensation and zero-voltage switching, wherein the control circuit uses a detection winding, which is wound on the primary side of the transformer but in phase with a secondary winding, to detect a voltage of the primary-side power switch or the primary-side current. When it is determined that the voltage of the primary-side power switch is zero, or when it is determined that the primary-side current is zero, the control circuit switches and turns on the primary-side power switch accordingly, thus substantially reducing the switching loss of the primary-side power switch that occurs at the instant when the primary-side power switch is turned on.

BRIEF DESCRIPTION OF THE SEVERAL VIEWS OF THE DRAWINGS

The invention as well as a preferred mode of use, further objects, and advantages thereof will be best understood by referring to the following detailed description of illustrative embodiments in conjunction with the accompanying drawings, in which.

DETAILED DESCRIPTION OF THE INVENTION

Figure 1:
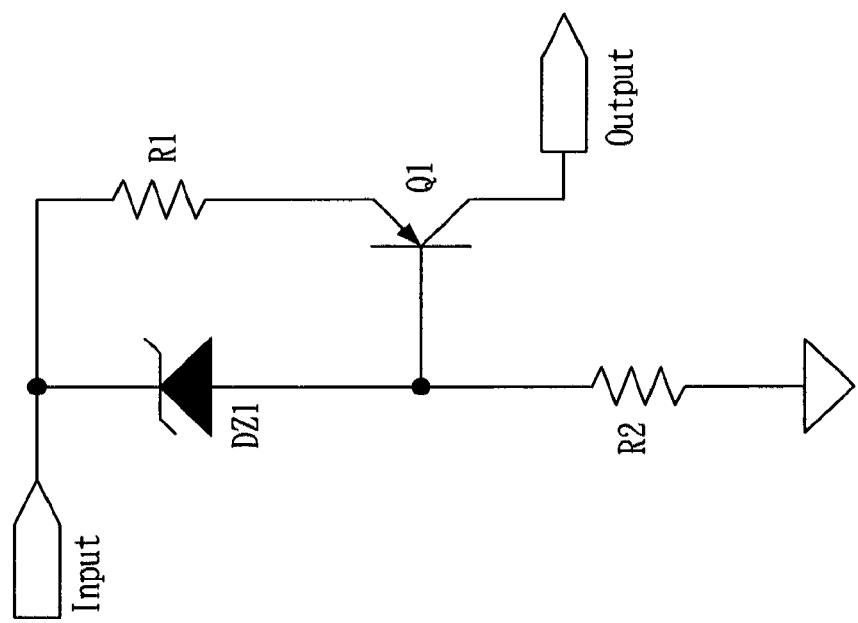
FIG. 1 shows a conventional simple constant-current circuit.
Figure 2:
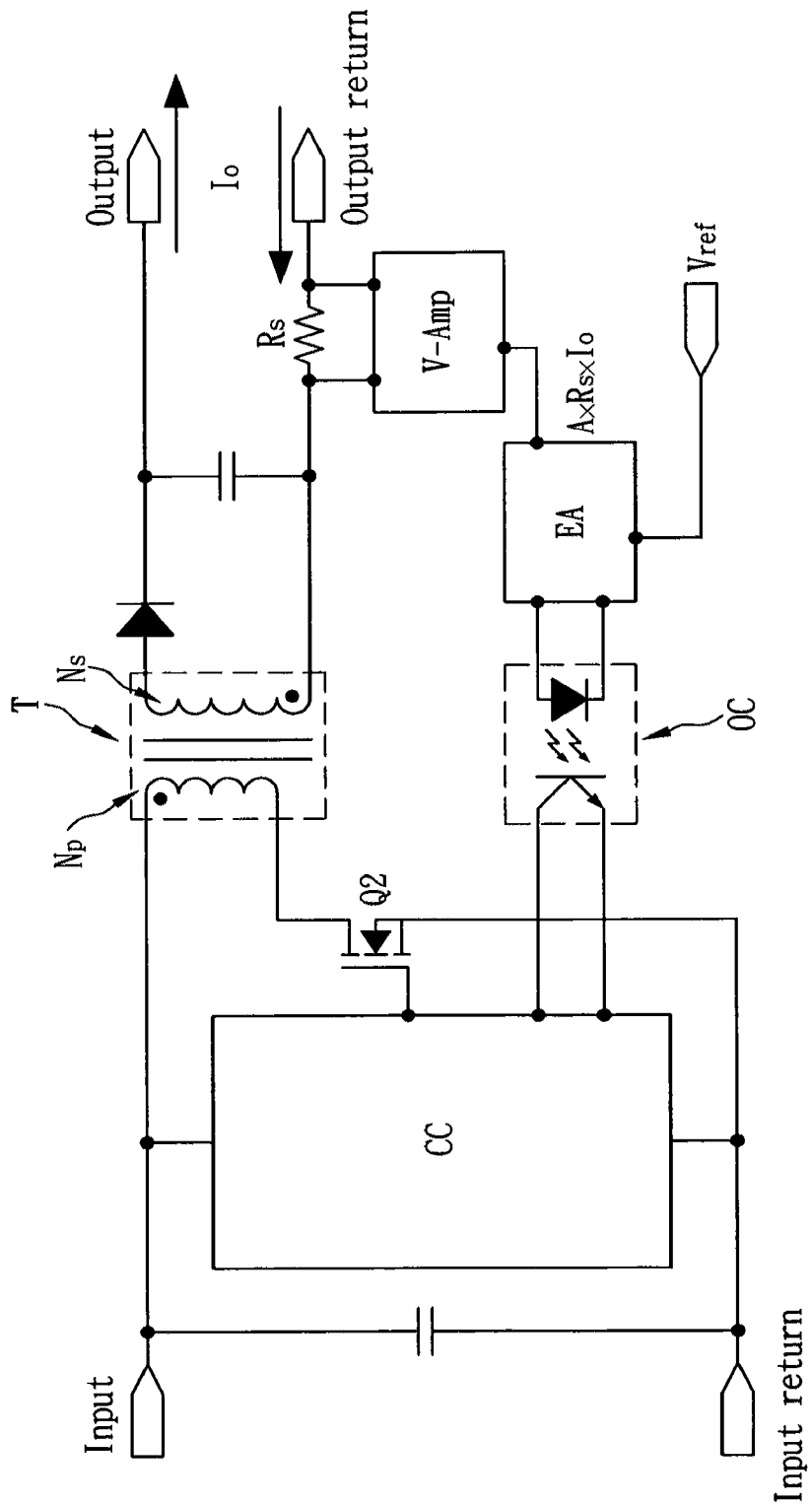
FIG. 2 shows a conventional single-switch isolated flyback converter.
Figure 3:
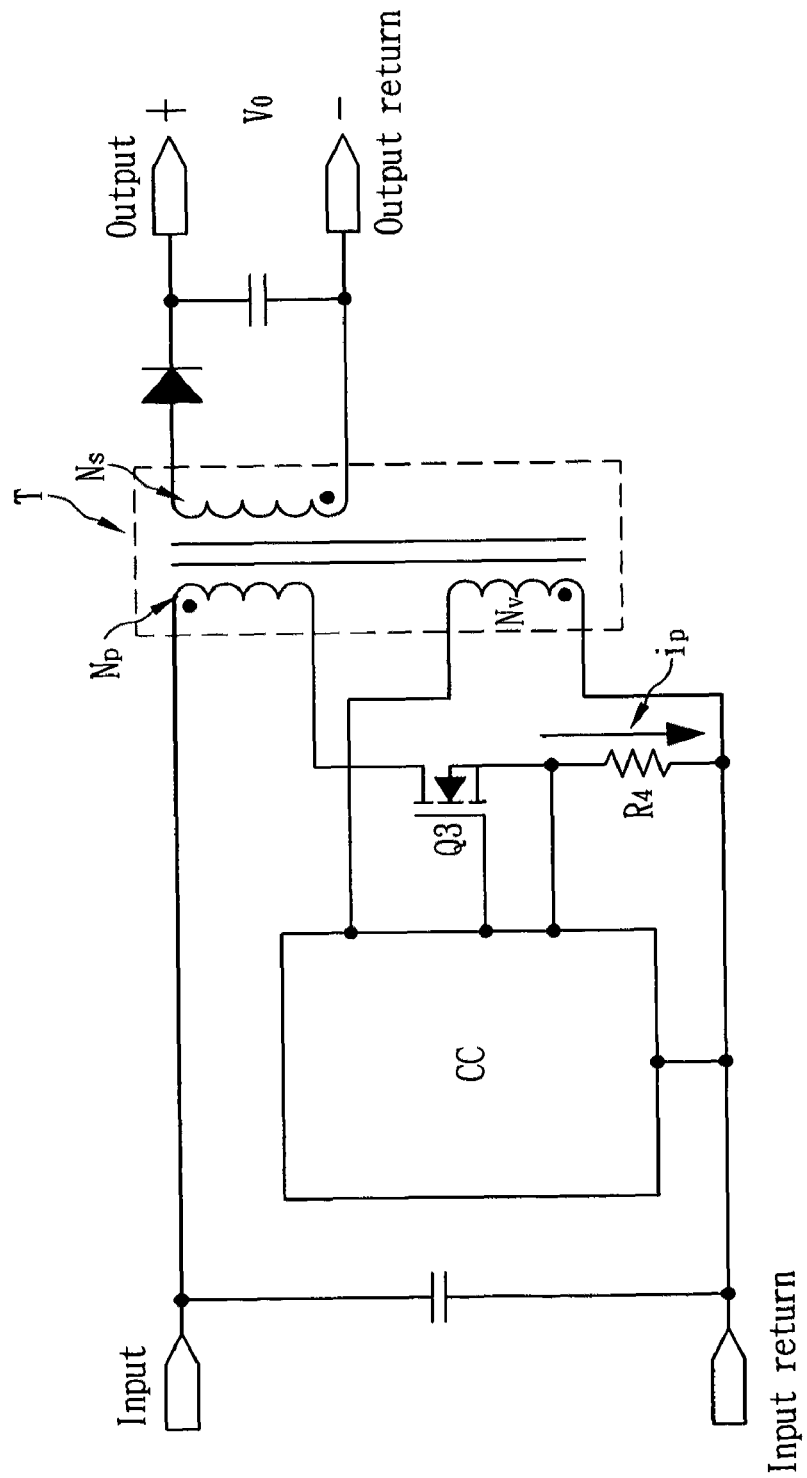
FIG. 3 shows a conventional single-switch isolated flyback converter that operates in constant-frequency DCM.
Figure 4:
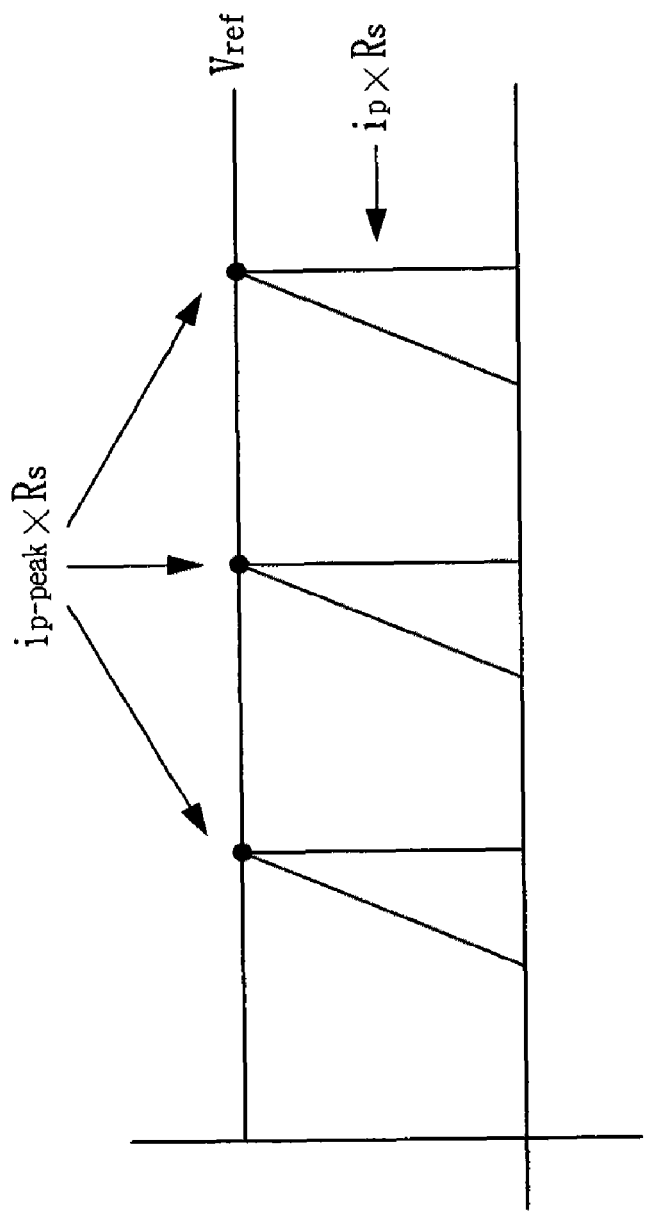
FIG. 4 is a waveform diagram in which the peak voltage $i_{p-peak} \times R_S$ resulting from a current $i_p$ in the primary winding $N_P$ of the conventional single-switch isolated flyback converter depicted in FIG. 3 is maintained at a reference voltage $V_{ref}$.
Figure 5:
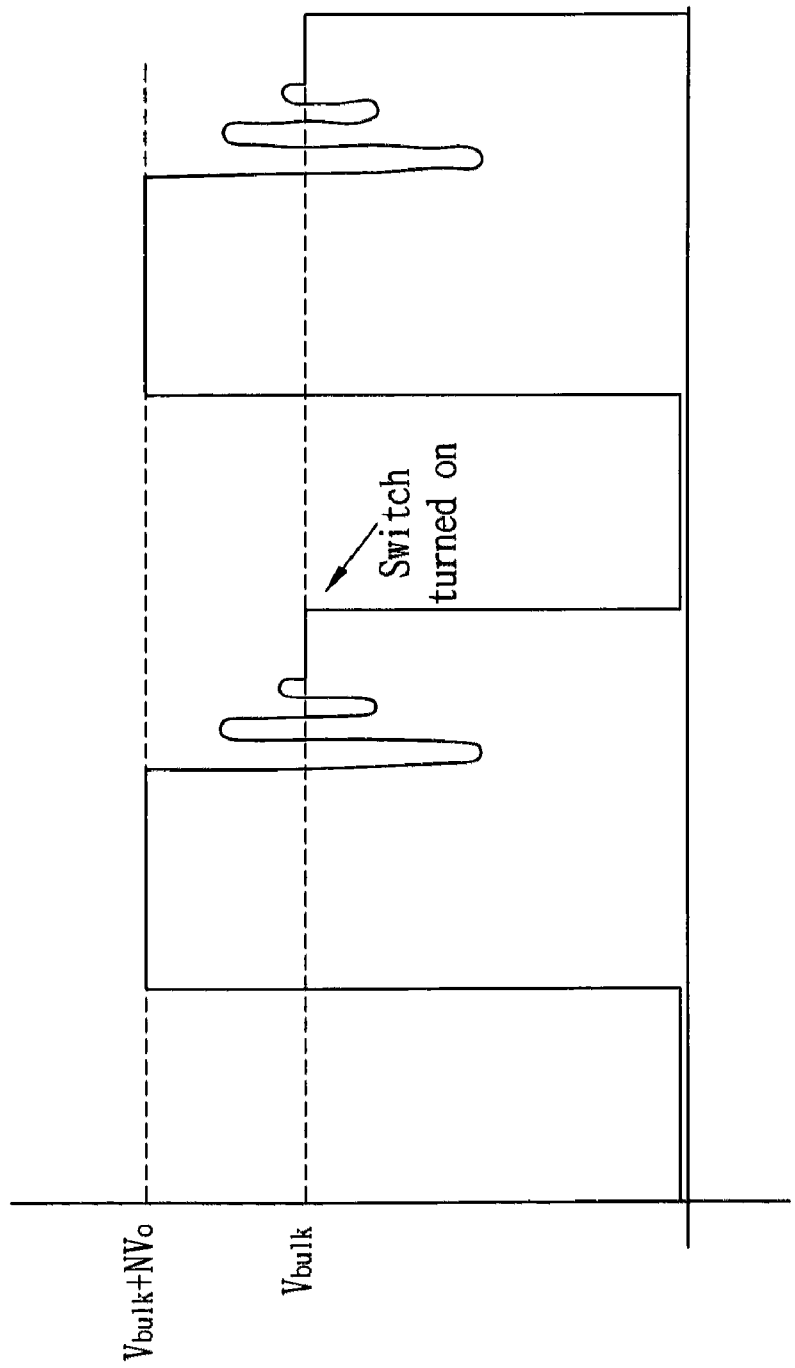
FIG. 5 shows the waveform of the drain-source voltage of a power switch Q3 in the conventional single-switch isolated flyback converter depicted in FIG. 3.
Figure 6:
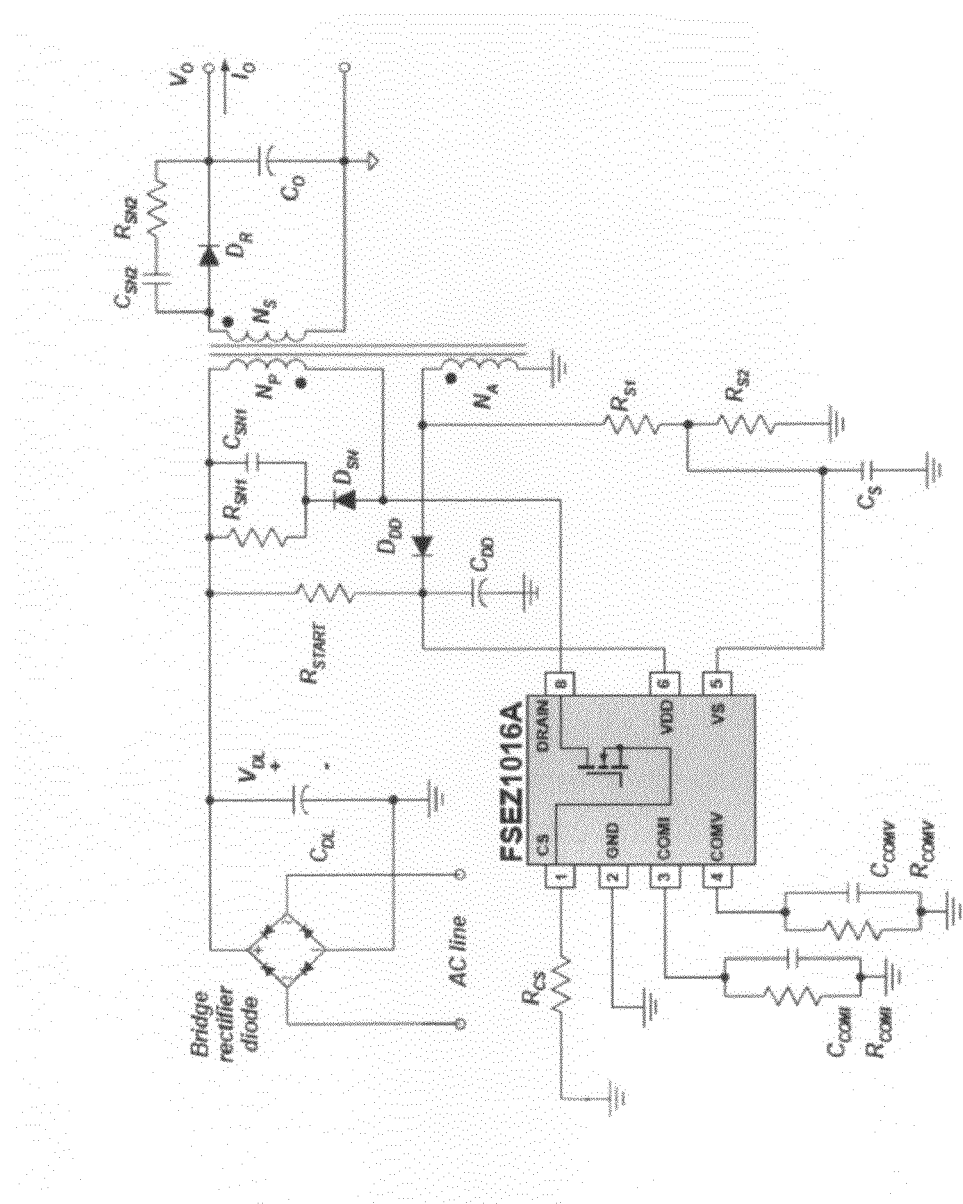
FIG. 6 is a circuit diagram of a constant-current circuit using a current control IC made by Fairchild Semiconductor and sold under the Model No. FSEZ1016A.
Figure 7:
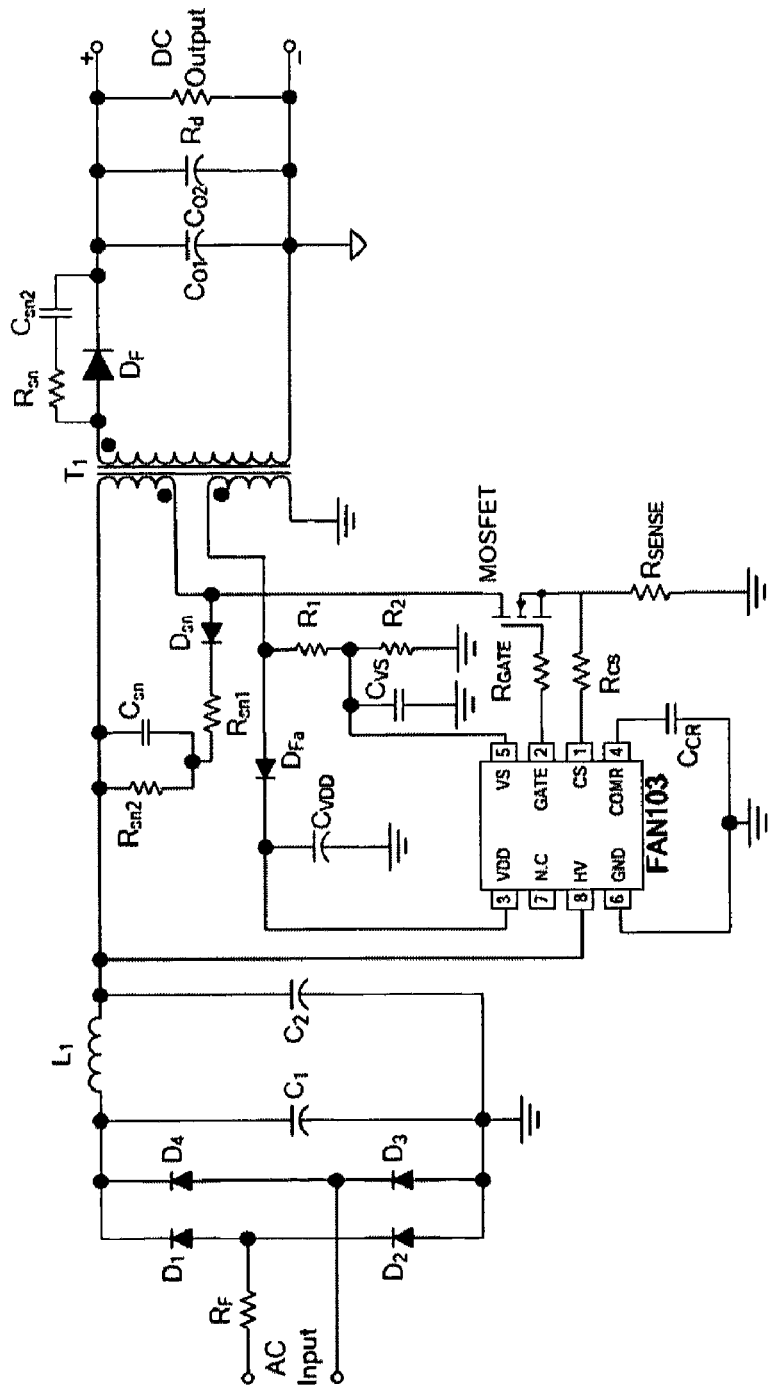
FIG. 7 is a circuit diagram of a constant-current circuit using a current control IC made by Fairchild Semiconductor and sold under the Model No. FAN103.
Figure 8:
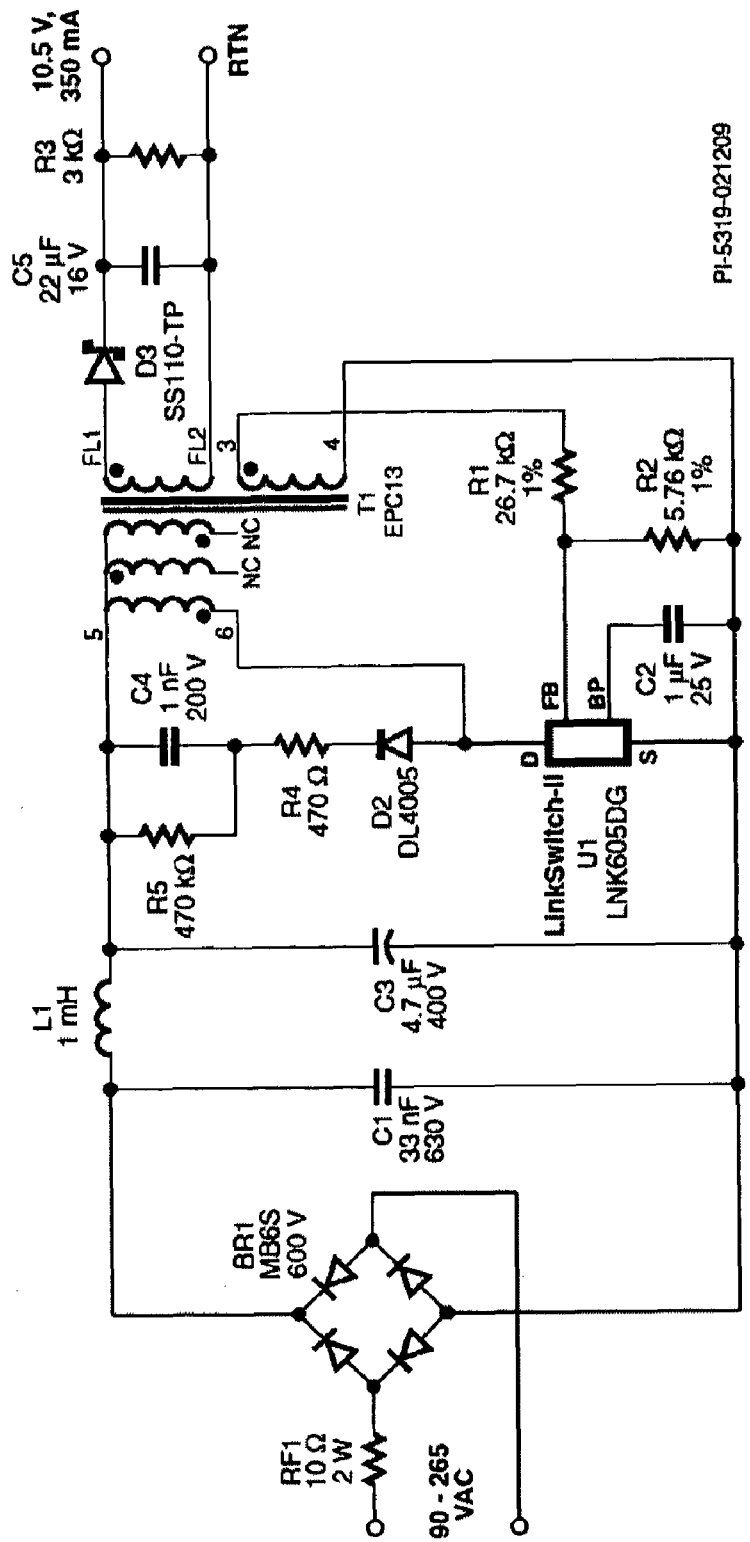
FIG. 8 is a circuit diagram of a constant-current circuit using a current control IC made by Power Integrations and sold under the Model No. LNK605DG.
Figure 9:
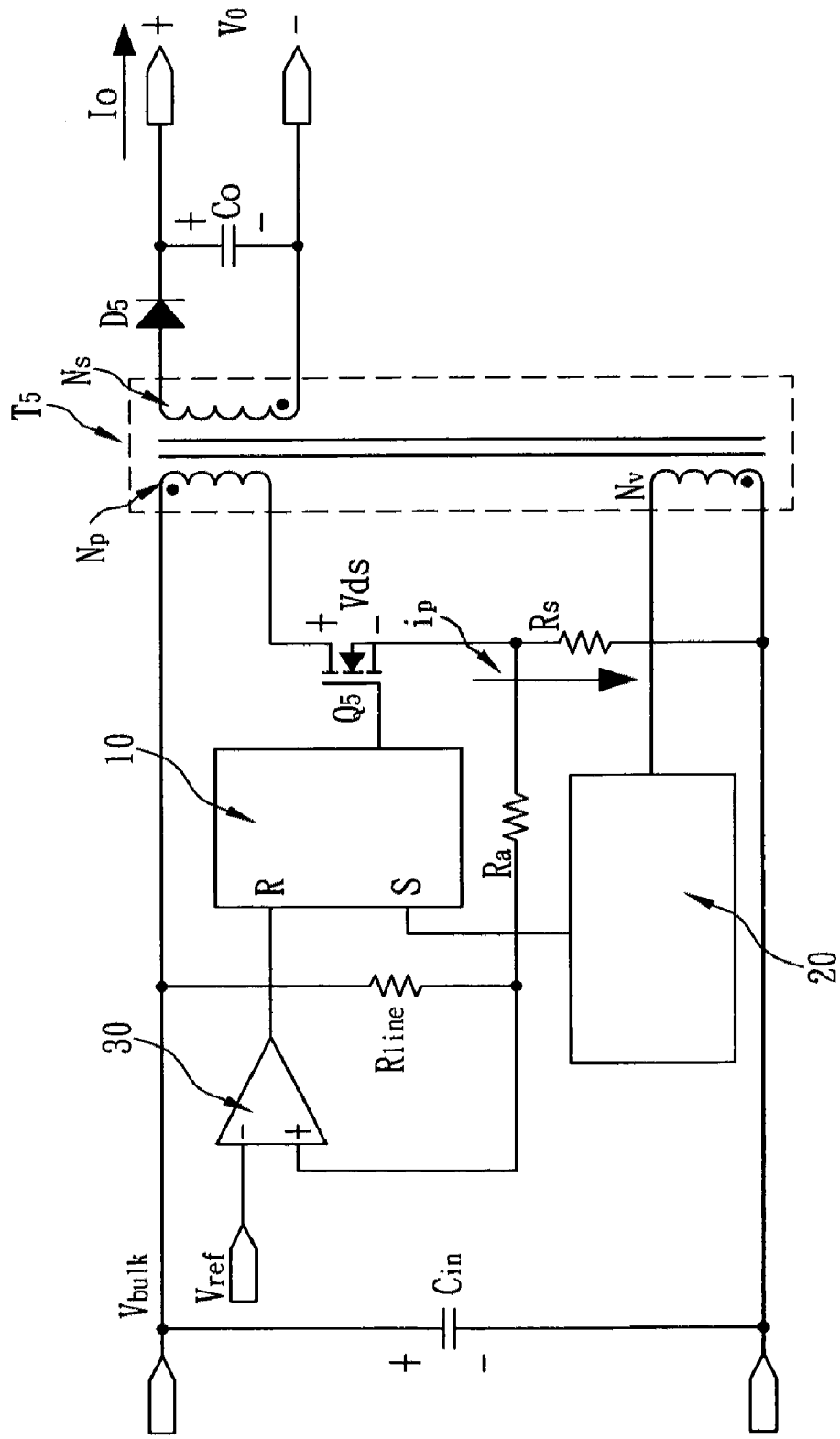
FIG. 9 shows a constant-current circuit according to a preferred embodiment of the present invention.

The present invention provides a constant-current circuit which is capable of voltage compensation as well as zero-voltage switching and is applicable to an LED-based lighting apparatus as an LED driving circuit whose output current stays constant. Referring to FIG. 9, the constant-current circuit is a single-switch isolated flyback converter operating in current mode and essentially includes a transformer $T_5$, an input-voltage filter capacitor $C_{in}$, a linear resistor $R_{line}$, an auxiliary resistor $R_a$, an RS latch 10, a detection circuit 20, a comparator 30, a primary-side power switch $Q_5$, a sensing resistor $R_S$, a secondary-side power diode $D_5$, and an output-voltage filter capacitor $C_o$. The positive and negative electrodes of the input-voltage filter capacitor $C_{in}$ are connected across the positive and negative ends of an input voltage $V_{bulk}$. The transformer $T_5$ is operated in transition mode rather than constant-frequency DCM and includes a primary winding $N_P$, a secondary winding $N_S$, and a detection winding $N_V$. The detection winding $N_V$ is wound on the primary side but is in phase with the secondary winding $N_S$. The primary winding $N_P$ has one end connected to the positive electrode of the input-voltage filter capacitor $C_{in}$ and the other end connected to the drain of the primary-side power switch $Q_5$. The secondary winding $N_S$ has one end connected to the negative electrode of the output-voltage filter capacitor $C_o$ and the other end connected to the anode of the secondary-side power diode $D_5$. The cathode of the secondary-side power diode $D_5$ is connected to the positive electrode of the output-voltage filter capacitor $C_o$, thus allowing the output-voltage filter capacitor $C_o$ to provide a fixed output current $I_O$ to LEDs connected across the output end. The source of the primary-side power switch $Q_5$ is connected to an end of the sensing resistor $R_S$. The detection winding $N_V$ has one end connected to the other end of the sensing resistor $R_S$ and the negative electrode of the input-voltage filter capacitor $C_{in}$, respectively, while the other end of the detection winding $N_V$ is connected to the input end of the detection circuit 20. The output end of the detection circuit 20 is connected to the set input end S of the RS latch 10. The output end of the RS latch 10 is connected to the gate of the primary-side power switch $Q_5$.

Figure 10:
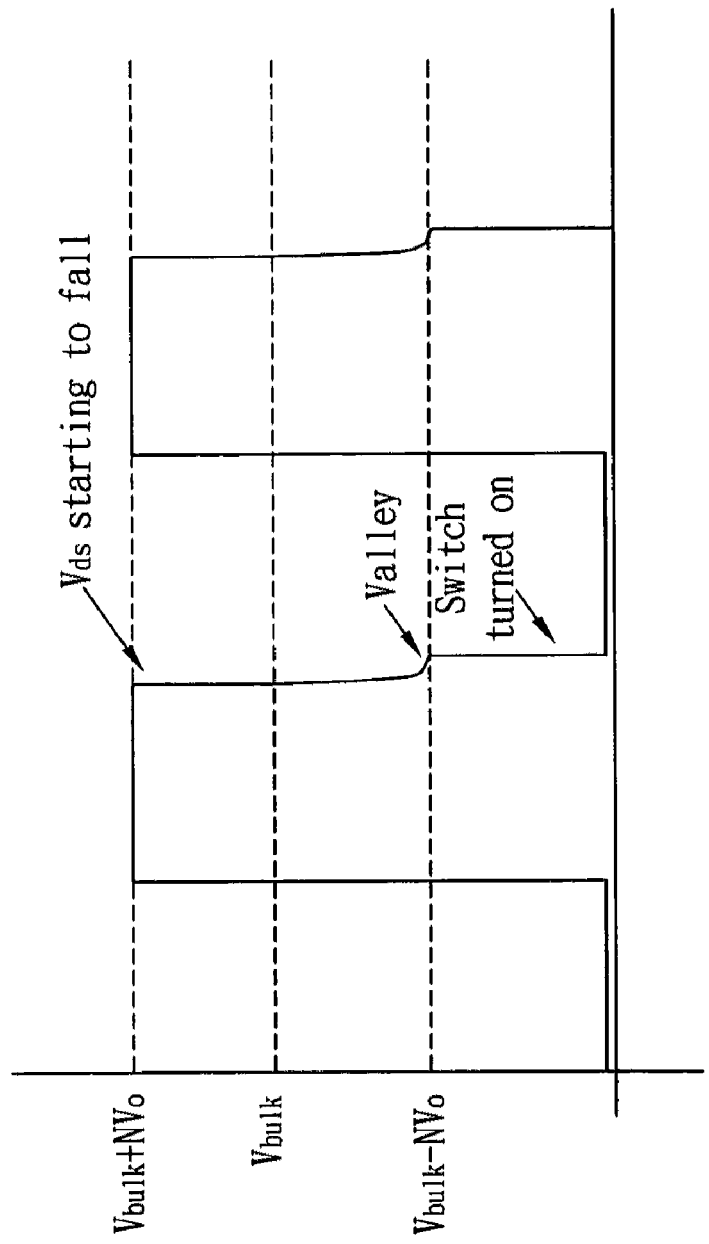
FIG. 10 shows the waveform of the drain-source voltage Vds of a primary-side power switch $Q_5$ in the embodiment depicted in FIG. 9.

As stated above, the constant-current circuit of the present invention is operated in transition mode. Therefore, when energy left in the transformer $T_5$ is insufficient to keep the secondary-side power diode $D_5$ in a conducting state, current in the secondary-side power diode $D_5$ drops to zero, thus turning the secondary-side power diode $D_5$ into a non-conducting state. As a result, a parasitic capacitance and an inductance in the circuit resonate, causing a drain-source voltage Vds of the primary-side power switch $Q_5$ to start generating a sine-wave oscillating voltage that oscillates about a center defined by the input voltage $V_{bulk}$, as shown in FIG. 10, wherein $NV_0$ indicates the amplitude of voltage oscillation. As the oscillating voltage is reflected in the detection winding $N_V$, the present invention detects the drain-source voltage Vds (or a primary-side current) via the detection winding $N_V$ using the detection circuit 20. When the detection circuit 20 determines that the drain-source voltage Vds reaches a valley (Theoretically, the lowest point $V_{bulk}-NV_0$ is zero; however, if the lowest point $V_{bulk}$-$NV_O$ goes below zero, it is still regarded as zero), or that the drain-source voltage Vds is zero, or that the primary-side current $i_p$ is zero, the detection circuit 20 outputs a corresponding setting signal. The RS latch 10 controls the switching of the primary-side power switch $Q_5$ and turns on the primary-side power switch $Q_5$ according to the setting signal. Thus, the switching loss the primary-side power switch $Q_5$ upon conduction is substantially reduced.

Figure 11:
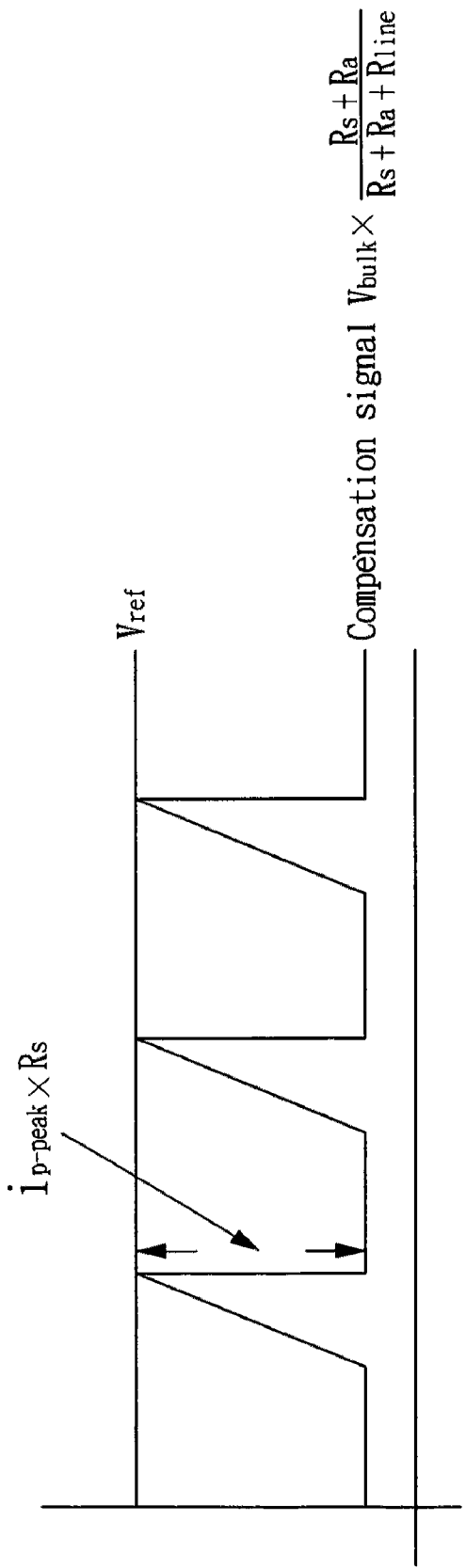
FIG. 11 shows the waveforms of voltages at two input ends of a comparator in the embodiment depicted in FIG. 9 when the input voltage $V_{bulk}$ is low.
Figure 12:
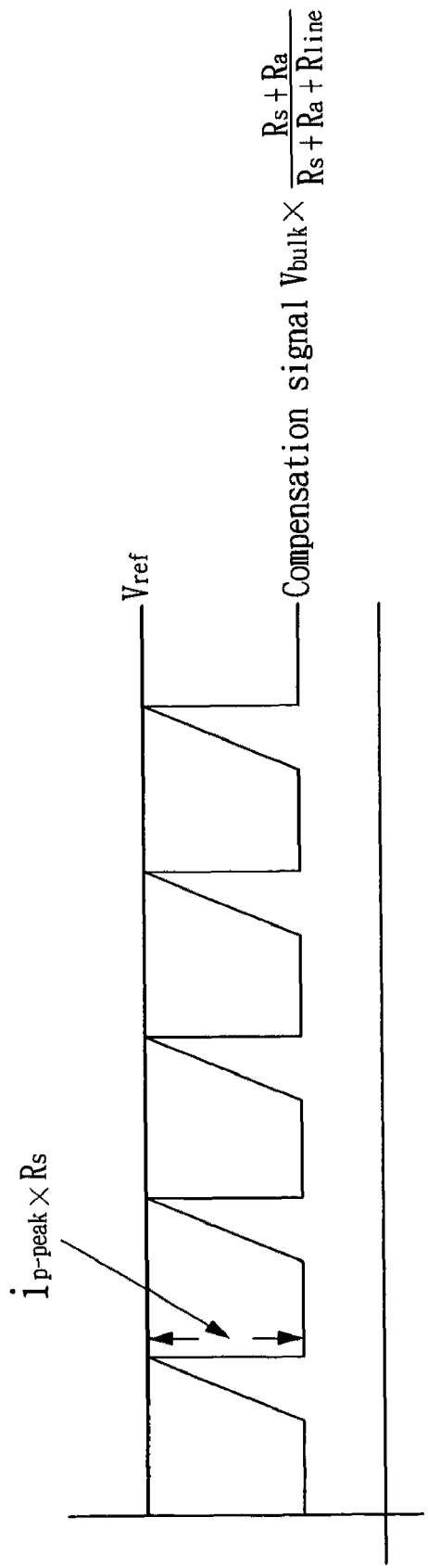
FIG. 12 shows the waveforms of voltages at the two input ends of the comparator in the embodiment depicted in FIG. 9 when the input voltage $V_{bulk}$ is high.

In addition, according to the present invention, the auxiliary resistor $R_a$ has one end connected to a line between the source of the primary-side power switch $Q_5$ and the sensing resistor $R_S$. Meanwhile, the other end of auxiliary resistor $R_a$ is connected to an input end of the comparator 30 and, by way of the linear resistor $R_{line}$, to a line between the positive end of the input voltage $V_{bulk}$ and one end of the primary winding $N_P$, respectively. The comparator 30 has the other input end connected to a reference voltage $V_{ref}$ and an output end connected to the reset input end R of the RS latch 10. Hence, the comparator 30 not only can obtain, through the sensing resistor $R_S$, information related to a voltage $i_p \times R_S$ resulting from the primary-side current $i_p$, but also can obtain a compensation signal $$V_{bulk} \times \frac{R_S + R_a}{R_S + R_a + R_{line}}$$

from the input voltage $V_{bulk}$ through voltage division and compensation carried out by a voltage divider in conjunction with the sensing resistor $R_S$, wherein the voltage divider is formed by the linear resistor $R_{line}$ and the auxiliary resistor $R_a$. By resetting the RS latch 10, the comparator 30 controls a threshold voltage of the primary-side power switch $Q_5$. In consequence, due to a compensating effect of the compensation signal $$V_{bulk} \times \frac{R_S + R_a}{R_S + R_a + R_{line}},$$

a peak voltage $i_{p-peak} \times R_S$ resulting from the sensing resistor $R_S$ is adjusted to the reference voltage $V_{ref}$ through adding the compensation signal $$V_{bulk} \times \frac{R_S + R_a}{R_S + R_a + R_{line}}$$

thereto. Please refer to FIG. 11 for voltage waveforms at the two input ends of the comparator 30 when the input voltage $V_{bulk}$ is a low voltage, and to FIG. 12 for voltage waveforms at the two input ends of the comparator 30 when the input voltage $V_{bulk}$ is a high voltage. FIGS. 11 and 12 clearly demonstrate that, since the reference voltage $V_{ref}$ is designed at a fixed value according to the practical needs of the constant-current circuit of the present invention, the compensation signal $$V_{bulk} \times \frac{R_S + R_a}{R_S + R_a + R_{line}}$$

has a stronger compensating effect on the peak voltage $i_{p-peak} \times R_S$ resulting from the primary-side current $i_p$ when the input voltage $V_{bulk}$ is higher. Therefore, when the input voltage $V_{bulk}$ is high, the peak value $i_{p-peak}$ of the primary-side current $i_p$ is effectively suppressed, thereby effectively lowering the output current $I_O$.

It can be known from the foregoing description that the constant-current circuit of the present invention is a variable-frequency single-switch isolated flyback converter whose output current $I_O$ can be calculated by Equation (6) as:

$$I_O = \frac{i_{P-peak} \times V_{bulk}}{2 \times V_O \times \left(1 + \frac{V_{bulk}}{NV_O}\right)} \tag{6}$$

where $V_O$ represents output voltage at the output end. By taking derivative of the output current $I_O$ with respect to the input voltage $V_{bulk}$, Equation (6) is transformed into Equation (7):

$$\frac{dI_O}{dV_{bulk}} = \frac{i_{P-peak}}{2V_O}\left(\frac{NV_O}{NV_O + V_{bulk}}\right)^2 > 0 \tag{7}$$

According to Equation (7), the output current $I_O$ will increase with the input voltage $V_{bulk}$ or decrease with the input voltage $V_{bulk}$. Therefore, the constant-current circuit of the present invention uses the sensing resistor $R_S$ to obtain information related to the voltage $i_p \times R_S$ resulting from the primary-side current $i_p$ and uses the voltage divider to obtain the compensation signal $$V_{bulk} \times \frac{R_S + R_a}{R_S + R_a + R_{line}},$$

so as to effectively reduce, by means of the comparator 30, the influence of the input voltage $V_{bulk}$ on the output current $I_O$, thereby allowing the output current $I_O$ to remain constant even if the input voltage $V_{bulk}$ varies over a wide range.

Figure 13:
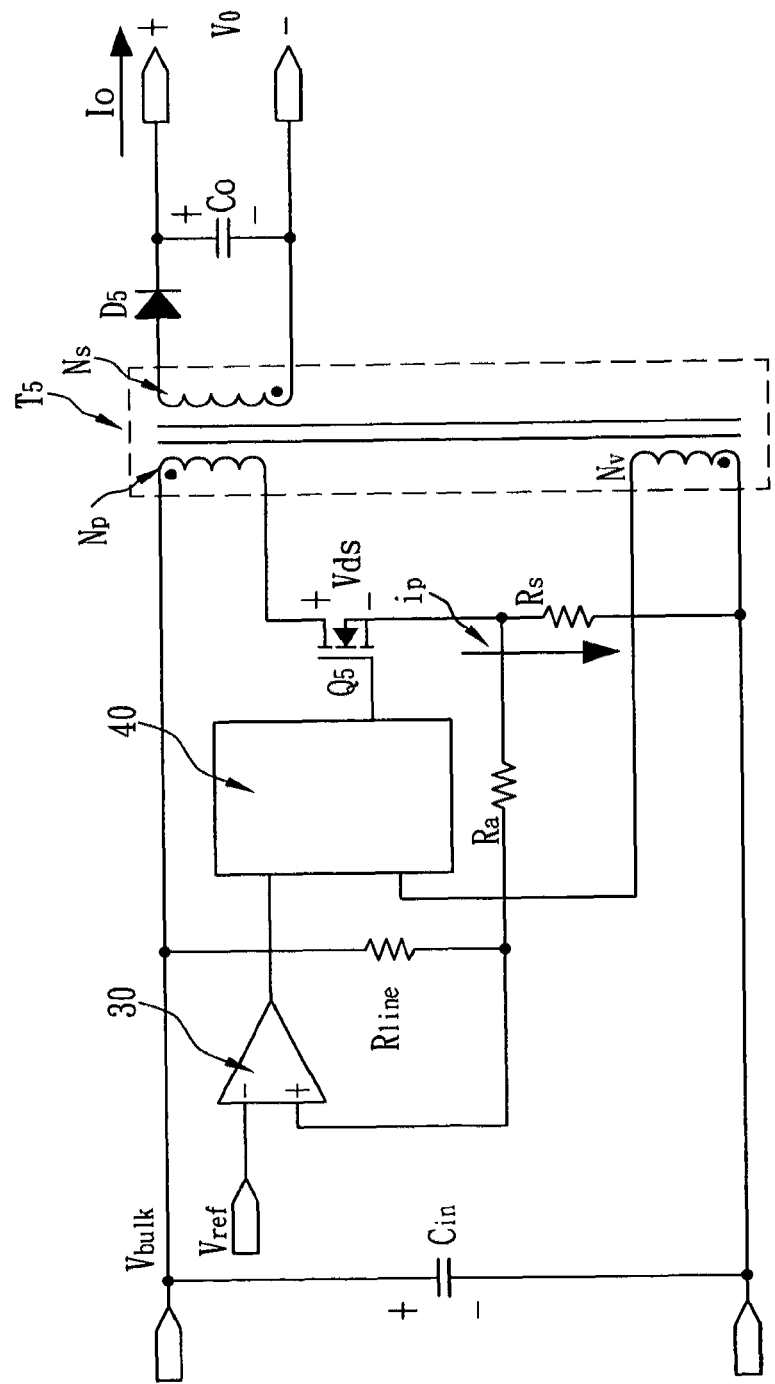
FIG. 13 shows another preferred embodiment of the present invention.
Figure 14:
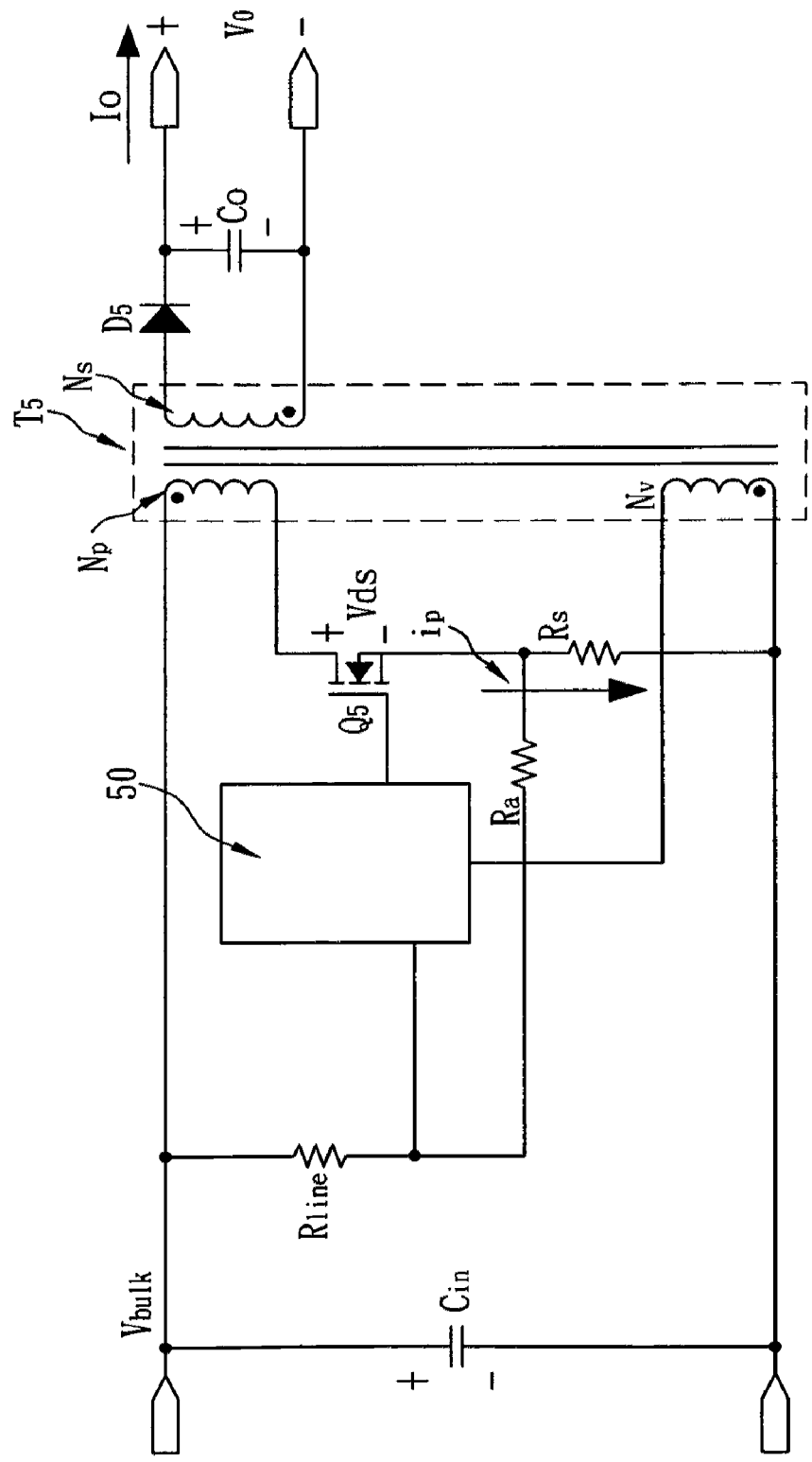
FIG. 14 shows yet another preferred embodiment of the present invention.

The embodiment described above is only a preferred embodiment of the present invention. Implementation of the present invention is by no means limited to the foregoing embodiment but can be modified according to practical needs. For example, the RS latch and the detection circuit in the constant-current circuit of the aforesaid embodiment can be integrated to form a control circuit 40, as shown in FIG. 13. Alternatively, the RS latch, the detection circuit, and the comparator can be integrated to form a control circuit 50, as shown in FIG. 14. As long as the control circuit can turn on the primary-side power switch $Q_5$ upon determining that the primary-side current $i_p$ is zero; obtain information related to the voltage $i_p \times R_S$ resulting from the primary-side current $i_p$, by way of the sensing resistor $R_S$; obtain the compensation signal $$V_{bulk} \times \frac{R_S + R_a}{R_S + R_a + R_{line}}$$

through the voltage divider; and thereby control the threshold voltage of the primary-side power switch $Q_5$ such that the peak voltage $i_{p-peak} \times R_S$ resulting from the sensing resistor $R_S$ is adjusted to the reference voltage $V_{ref}$ through adding the compensation signal $$V_{bulk} \times \frac{R_S + R_a}{R_S + R_a + R_{line}}$$

thereto, thus keeping the output current $I_O$ constant, the resultant constant-current circuit falls within the scope of the present invention.

Likewise, in another embodiment of the present invention, the voltage divider is not limited to that shown in FIG. 9. A person skilled in the art may design a different voltage divider that is based on the design concept of the present invention and is equally capable of obtaining a compensation signal from the input voltage $V_{bulk}$ and then controlling the threshold voltage of the primary-side power switch $Q_5$ accordingly such that the peak voltage $i_{p-peak} \times R_S$ resulting from the sensing resistor $R_S$ is adjusted to the reference voltage $V_{ref}$ due to the compensating effect of the compensation signal $$V_{bulk} \times \frac{R_S + R_a}{R_S + R_a + R_{line}}.$$

All such equivalent constant-current circuits are within the scope of the present invention.

To verify the performance of the constant-current circuit proposed by the present invention, experiments were conducted on the constant-current circuit shown in FIG. 9 with or without the voltage divider. In the experiments where the voltage divider was absent, an alternating-current power source of 90~260V was converted into a DC power source of 127~368 V as the input voltage $V_{bulk}$ of the constant-current circuit, whose output voltage $V_O$ was designed at 24 V (DC). Further, the ratio of turns between the primary winding $N_P$ and the secondary winding $N_S$ (or the detection winding $N_V$) was 2.5. In addition, the sensing resistor $R_S$ had a resistance of 1 Ω while the reference voltage $V_{ref}$ was 0.5 V (DC). In the absence of any compensation signal available from the input voltage $V_{bulk}$, the percentage differences between the output currents $I_O$ corresponding to various input voltages $V_{bulk}$ (127~368V) and the output current $I_O$ corresponding to an input voltage $V_{bulk}$ of 90 V were recorded and are tabulated as follows:

| Input voltage $V_{bulk}$ | Output current $I_O$ | Percentage difference |
|---|---|---|
| 127 V | 0.42 A | 0 |
| 156 V | 0.45 A | 7.1 |
| 184 V | 0.47 A | 11.9 |
| 283 V | 0.52 A | 23.8 |
| 325 V | 0.53 A | 26.2 |
| 368 V | 0.54 A | 28.6 |

It can be known from the table above that, without the voltage divider, the output current $I_O$ of the constant-current circuit varied violently with the input voltage $V_{bulk}$. In other words, this constant-current circuit cannot provide a stable output current $I_O$ to LEDs, let alone maintain the luminosity thereof. Even worse, the output current $I_O$ may become so high that the LEDs will burn.

In the experiments where the constant-current circuit shown in FIG. 9 was complete with the voltage divider, the linear resistor $R_{line}$ had a resistance designed at 1 MΩ, and the auxiliary resistor $R_a$ had a resistance designed at 400Ω. In the presence of the compensation signal $$V_{bulk} \times \frac{R_S + R_a}{R_S + R_a + R_{line}}$$

obtained by the comparator 30 from the input voltage $V_{bulk}$, the percentage differences between the output currents $I_O$ corresponding to various input voltages $V_{bulk}$ (127~368V) and the output current $I_O$ corresponding to an input voltage $V_{bulk}$ of 90 V were recorded and are presented as follows:

| Input voltage $V_{bulk}$ | Output current $I_O$ | Percentage difference |
|---|---|---|
| 127 V | 0.373 A | 0 |
| 156 V | 0.385 A | 3.22 |
| 184 V | 0.390 A | 4.55 |
| 283 V | 0.385 A | 3.22 |
| 325 V | 0.376 A | 0.8 |
| 368 V | 0.364 A | −2.41 |

According to the experiment results shown in this table, when the voltage divider was present, the output current $I_O$ of the constant-current circuit barely varied with the input voltage $V_{bulk}$. Hence, this constant-current circuit can provide a stable output current $I_O$ to LEDs, maintain the luminosity thereof, and effectively prevent the LEDs from burning.

Figure 15:
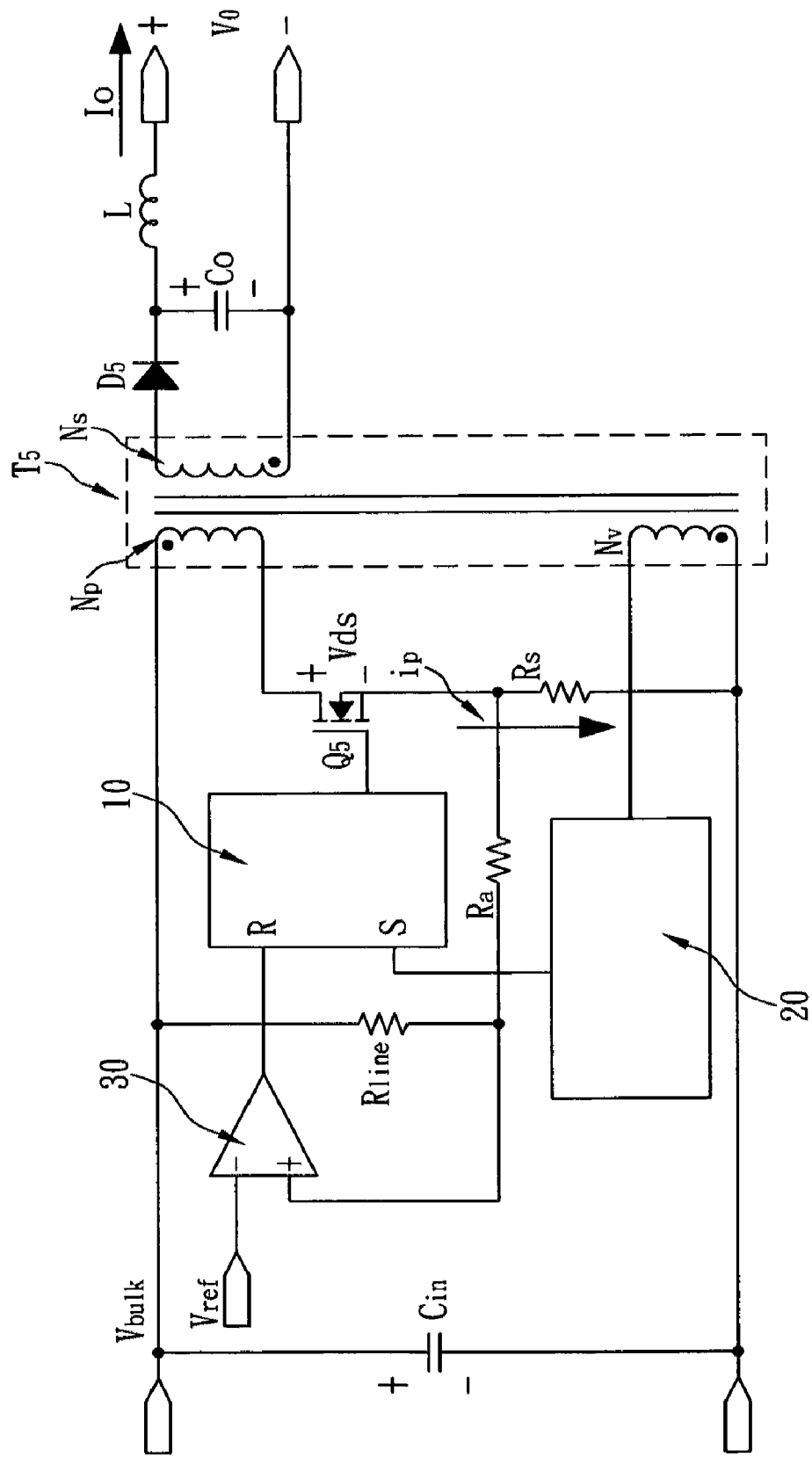
FIG. 15 shows still another preferred embodiment of the present invention.

It should be mentioned that, in order not to shorten the overall service life of the constant-current circuit of the present invention by using an electrolytic capacitor of a high capacitance as the output-voltage filter capacitor $C_o$, it is feasible in another embodiment, as shown in FIG. 15, to use an non-electrolytic capacitor in conjunction with an inductor L series-connected to the output end of the constant-current circuit of the present invention, thereby effectively extending the service life of the constant-current circuit.

As described above, the constant-current circuit of the present invention can dispense with any secondary constant-current detection circuits or feedback circuits and only use a very simple circuit composed of inexpensive electronic components (e.g., resistors, RS latches, detection circuits, and comparators) to achieve the following: to obtain all necessary information from the primary-side (e.g., the compensation signal $$V_{bulk} \times \frac{R_S + R_a}{R_S + R_a + R_{line}}$$

from the input voltage $V_{bulk}$ and the primary-side current $i_p$); to control the threshold voltage of the primary-side power switch $Q_5$ according to the designed reference voltage $V_{ref}$, thus allowing the output current $I_O$ generated from the constant-current circuit of the present invention to stay constant over a wide range of the input voltage $V_{bulk}$; to provide a stable output current $I_O$ to LEDs and maintain the luminosity thereof; and to effectively reduce the switching loss of the primary-side power switch $Q_5$, thereby effectively increasing the power conversion efficiency.

The present invention has been described with a preferred embodiment thereof and it is understood that many changes and modifications to the described embodiment can be carried out without departing from the scope and the spirit of the invention that is intended to be limited only by the appended claims.

What is claimed is:

1. A constant-current-output circuit capable of voltage compensation and zero-voltage switching, the constant-current-output circuit being a single-switch isolated flyback converter and comprising:
   a transformer having a primary side for receiving an input voltage and a secondary side for providing an output voltage, wherein the primary side comprises a primary winding and a detection winding, the secondary side comprises a secondary winding, the primary winding has a first end connected to the input voltage, and the detection winding is in phase with the secondary winding and has a first end connected to the input voltage;
   a primary-side power switch connected to a second end of the primary winding;
   a sensing resistor connected to the primary-side power switch so as to sense information related to a primary-side current;
   a voltage divider having a first end for receiving the input voltage and a second end connected to a line between the sensing resistor and the primary-side power switch so as to generate a compensation signal; and
   a control circuit for obtaining the information related to the primary-side current through the sensing resistor, obtaining the compensation signal through the voltage divider, and controlling the primary-side power switch accordingly, so as to adjust a peak voltage resulting from the sensing resistor to a reference voltage through adding the compensation signal thereto, thus enabling the secondary side to generate a constant output current, wherein the control circuit has a first input end connected to a second end of the detection winding, so that the control circuit detects a voltage on the detection winding and, upon determining that the voltage on the detection winding is around zero, turns on the primary-side power switch accordingly.

2. The constant-current-output circuit of claim 1, wherein the sensing resistor has a first end connected to the primary-side power switch and a second end connected to the first end of the detection winding, the voltage divider is connected to a second input end of the control circuit, and the control circuit has an output end connected to the primary-side power switch so as to control the primary-side power switch.

3. The constant-current-output circuit of claim 2, wherein the voltage divider comprises:
   a linear resistor having a first end connected to a line between the input voltage and the primary winding so as to receive the input voltage; and
   an auxiliary resistor having a first end connected to the line between the primary-side power switch and the sensing resistor and a second end connected to a second end of the linear resistor, wherein a line between the auxiliary resistor and the linear resistor is connected to the second input end of the control circuit.

4. The constant-current-output circuit of claim 3, further comprising an input-voltage filter capacitor connected across the input voltage.

5. The constant-current-output circuit of claim 3, further comprising an output-voltage filter capacitor connected across the output voltage.

6. The constant-current-output circuit of claim 4, further comprising an output-voltage filter capacitor connected across the output voltage.

7. The constant-current-output circuit of claim 5, further comprising a secondary-side power diode series-connected in a line between an end of the secondary winding and an end of the output-voltage filter capacitor.

8. The constant-current-output circuit of claim 6, further comprising a secondary-side power diode series-connected in a line between an end of the secondary winding and an end of the output-voltage filter capacitor.

9. The constant-current-output circuit of claim 7, further comprising an inductor series-connected in a line carrying the output current.

10. The constant-current-output circuit of claim 8, further comprising an inductor series-connected in a line carrying the output current.

11. A constant-current-output circuit capable of voltage compensation and zero-voltage switching, the constant-current-output circuit being a single-switch isolated flyback converter and comprising:
   a transformer having a primary side for receiving an input voltage and a secondary side for providing an output voltage, wherein the primary side comprises a primary winding and a detection winding, the secondary side comprises a secondary winding, the primary winding has a first end connected to the input voltage, and the detection winding is in phase with the secondary winding and has a first end connected to the input voltage;
   a primary-side power switch connected to a second end of the primary winding;
   a sensing resistor connected to the primary-side power switch so as to sense information related to a primary-side current;
   a voltage divider having a first end for receiving the input voltage and a second end connected to a line between the sensing resistor and the primary-side power switch so as to generate a compensation signal;
   a comparator having a first input end connected to the voltage divider and a second input end connected to a reference voltage; and
   a control circuit having a first input end connected to an output end of the comparator so as to control the primary-side power switch according to the information related to the primary-side current and the compensation signal obtained through the comparator, and adjust a peak voltage resulting from the sensing resistor to a reference voltage through adding the compensation signal thereto, thus enabling the secondary side to generate a constant output current, wherein the control circuit has a first input end connected to a second end of the detection winding, so that the control circuit detects a voltage on the detection winding and, upon determining that the voltage on the detection winding is around zero, turns on the primary-side power switch accordingly.

12. The constant-current-output circuit of claim 11, wherein the sensing resistor has a first end connected to the primary-side power switch and a second end connected to the input voltage, and the control circuit has an output end connected to the primary-side power switch so as to control the primary-side power switch.

13. The constant-current-output circuit of claim 12, wherein the voltage divider comprises:
   a linear resistor having a first end connected to a line between the input voltage and the primary winding so as to receive the input voltage; and
   an auxiliary resistor having a first end connected to the line between the primary-side power switch and the sensing resistor and a second end connected to a second end of the linear resistor, wherein a line between the auxiliary resistor and the linear resistor is connected to the first input end of the comparator.

14. The constant-current-output circuit of claim 13, wherein the control circuit comprises:

a detection circuit having an input end connected to the second end of the detection winding so as to detect the voltage of the primary-side power switch or the primary-side current; and an RS latch having a set input end connected to an output end of the detection circuit, a reset input end connected to the output end of the comparator, and an output end connected to the primary-side power switch so as to control the primary-side power switch.

15. The constant-current-output circuit claim 14, further comprising an input-voltage filter capacitor connected across the input voltage.

16. The constant-current-output circuit of claim 14, further comprising an output-voltage filter capacitor connected across the output voltage.

17. The constant-current-output circuit of claim 15, further comprising an output-voltage filter capacitor connected across the output voltage.

18. The constant-current-output circuit of claim 16, further comprising a secondary-side power diode series-connected in a line between an end of the secondary winding and an end of the output-voltage filter capacitor.

19. The constant-current-output circuit of claim 17, further comprising a secondary-side power diode series-connected in a line between an end of the secondary winding and an end of the output-voltage filter capacitor.

20. The constant-current-output circuit of claim 18, further comprising an inductor series-connected in a line carrying the output current.

21. The constant-current-output circuit of claim 19, further comprising an inductor series-connected in a line carrying the output current.

\* \* \* \* \*